(12) United States Patent
Barrett et al.

(10) Patent No.: US 12,051,162 B2
(45) Date of Patent: Jul. 30, 2024

(54) AUGMENTED REALITY LOCATION OPERATION USING CONSTELLATION INFORMATION

(71) Applicant: Dell Products L.P., Round Rock, TX (US)

(72) Inventors: Robert Alan Barrett, Austin, TX (US); Richard W. Guzman, Lago Vista, TX (US)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 17/720,791

(22) Filed: Apr. 14, 2022

(65) Prior Publication Data

US 2023/0334786 A1  Oct. 19, 2023

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01); *G06T 2207/30204* (2013.01)

(58) Field of Classification Search
CPC ..................... G06T 19/006; G06T 7/70; G06T 2207/30204
See application file for complete search history.

(56) References Cited

U.S. PATENT DOCUMENTS

| 5,072,838 | A | 12/1991 | Price, Jr. et al. |
| 10,430,655 | B2 | 10/2019 | Komatsu |
| 10,846,561 | B1 * | 11/2020 | Floerkemeier ............ G06T 7/73 |
| 11,145,123 | B1 | 10/2021 | Chor et al. |
| 11,217,020 | B2 | 1/2022 | Goodrich et al. |
| 11,275,944 | B1 | 3/2022 | Bhushan et al. |
| 11,321,965 | B2 | 5/2022 | Lyer et al. |
| 11,527,148 | B1 | 12/2022 | Volkerink et al. |
| 11,674,807 | B2 | 6/2023 | Price et al. |
| 2015/0348329 | A1 | 12/2015 | Carre et al. |
| 2017/0358139 | A1 | 12/2017 | Balan et al. |
| 2019/0095712 | A1 * | 3/2019 | Jung .................... H04N 23/632 |
| 2019/0138834 | A1 | 5/2019 | Collet Romea et al. |
| 2019/0156577 | A1 | 5/2019 | Barros et al. |
| 2020/0050857 | A1 | 2/2020 | Anello et al. |
| 2021/0027458 | A1 | 1/2021 | Chor et al. |

(Continued)

FOREIGN PATENT DOCUMENTS

WO    2022072736 A1    4/2022

OTHER PUBLICATIONS

Vod Cart, "USB LED Fan Clock from Vodcart", Jul. 15, 2013, Youtube.com, https://www.youtube.com/watch?v=1q06ssnHq5Y (Year: 2013).

*Primary Examiner* — Ryan R Yang
(74) *Attorney, Agent, or Firm* — Terrile, Cannatti & Chambers, LLP; Stephen A. Terrile

(57) ABSTRACT

A method for performing an augmented reality location operation. The augmented reality location operation includes: configuring an augmented reality device to perform an augmented reality tracking method; identifying a unique augmented reality target the augmented reality tracking method, the unique augmented reality target comprising an augmented reality constellation; associating a position with the unique augmented reality target; and, using the position to perform an augmented reality projection operation.

20 Claims, 9 Drawing Sheets

(56) References Cited

U.S. PATENT DOCUMENTS

2021/0374406 A1 12/2021 Brun et al.
2022/0108088 A1 4/2022 Volkerink et al.
2022/0110189 A1 4/2022 Volkerink et al.
2022/0141082 A1 5/2022 Brun et al.
2022/0335805 A1 10/2022 Volkerink et al.
2023/0116929 A1 4/2023 Zohar et al.

* cited by examiner

AUGMENTED REALITY LOCATION OPERATION USING CONSTELLATION INFORMATION

BACKGROUND OF THE INVENTION

Field of the Invention

The present invention relates to information handling systems. More specifically, embodiments of the invention relate to an augmented reality location operation which includes augmented reality tracking handoff.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing an augmented reality location operation comprising: configuring an augmented reality device to perform an augmented reality tracking method; identifying a unique augmented reality target the augmented reality tracking method, the unique augmented reality target comprising an augmented reality constellation; associating a position with the unique augmented reality target; and, using the position to perform an augmented reality projection operation.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: configuring an augmented reality device to perform an augmented reality tracking method; identifying a unique augmented reality target the augmented reality tracking method, the unique augmented reality target comprising an augmented reality constellation; associating a position with the unique augmented reality target; and, using the position to perform an augmented reality projection operation.

In another embodiment the invention relates to a non-transitory, computer-readable storage medium embodying computer program code, the computer program code comprising computer executable instructions configured for: configuring an augmented reality device to perform an augmented reality tracking method; identifying a unique augmented reality target the augmented reality tracking method, the unique augmented reality target comprising an augmented reality constellation; associating a position with the unique augmented reality target; and, using the position to perform an augmented reality projection operation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
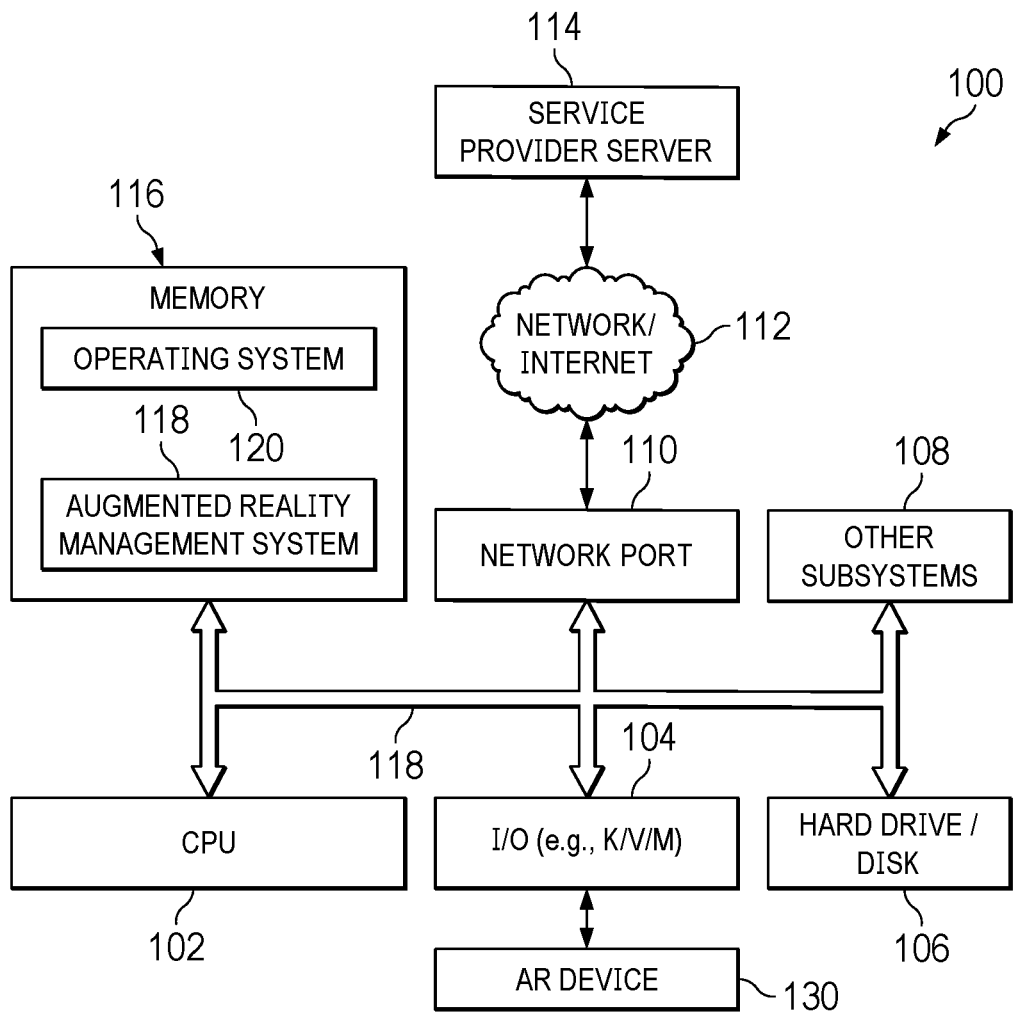
FIG. 1 shows a general illustration of components of an information handling system as implemented in the system and method of the present invention.

Certain aspects of the present disclosure reflect an appreciation that an issue associated with augmented reality (AR) location identification relates to augmented reality drift. Certain aspects of the present disclosure reflect an appreciation that AR drift is often caused by reliance on a single AR tracking method where the single AR tracking method may initially work well initially but cause accuracy deterioration over time. Various aspects of the present disclosure include an appreciation that accuracy deterioration may be determined using a confidence score. Certain aspects of the present disclosure reflect an appreciation that AR drift can introduce serious errors when performing AR operations such as when an AR projection becomes misaligned with the physical hardware associated with the AR projection. Certain aspects of the present disclosure include an appreciation that AR drift can be an especially troubling issue when AR is used within an IT environment such as a data center. Certain aspects of the present disclosure include an appreciation that AR drift can be an especially troubling issue when projecting AR projections within the IT environment.

Certain aspects of the present disclosure reflect an appreciation that AR drift can be caused due to an insufficient number of AR targets and/or tracking methods, or weak/nonexistent relationships between AR targets. Certain aspects of the present disclosure include an appreciation that many known AR applications use a single tracking method to catalogue one type of target. Certain aspects of the present disclosure include an appreciation that AR drift can be an especially troubling issue when AR is used within an IT environment such as a data center.

A system, method, and computer-readable medium for performing an AR location identification operation are disclosed. An augmented reality location identification operation is one example of an augmented reality location operation. In certain embodiments, the AR location identification operation uses a plurality of AR tracking methods to recognize common and unique AR targets. In certain embodiments, the AR location identification operation continuously uses the plurality of AR tracking methods. In certain embodiments, the AR location identification operation records relative two dimensional or three dimensional coordinates of the common and unique AR targets in a database. In certain embodiments, the recorded coordinates provide a catalogue of points. These catalogued points can be recalled when a recorded target is within the field of view of an AR device. Such a catalog provides a robust database to project AR overlays accurately, even when the field of view is limited to a subset of items that would not otherwise be recognizable.

An augmented reality drift reduction operation is an example of an augmented reality location operation. In certain embodiments, the augmented reality drift reduction operation uses a plurality of AR tracking methods and compares the strength of certain various AR tracking methods to prioritize and select (handoff) a preferable AR tracking method. In certain embodiments, the preferable AR tracking method provides the most accurate AR projection for a user's point of view. In certain embodiments, the augmented reality drift reduction operation uses a confidence score generated for each available tracking method to determine whether to handoff to a different AR tracking method. In certain embodiments, handing off to a different AR tracking method establishes a new origin for AR tracking and provides a more accurate AR projection (i.e., an AR projection which is more closely aligned with the physical hardware associated with the AR projection).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise AR location identification system 118. In one embodiment, the information handling system 100 is configured to download the AR location identification system 118 from the service provider server 142. In another embodiment, the AR location identification system 118 is provided as a service from the service provider server 142.

In various embodiments, the information handling system 100 communicates with an AR device 130. In various embodiments, the AR device 130 communicates with the AR location identification system 118. In various embodiments, the AR device itself comprises an information handling system. In various embodiments, the AR location identification system 118 executes on the information handling system 100, the AR device 130 or a combination of the information handling system 100 and the AR device 130. In various embodiments, the AR device 130 can include one or more of an AR headset and a mobile device such as a mobile phone or tablet. Generally, an AR device 130 includes a camera as well as a means of visually providing information such as a display device which interacts with the camera. In various embodiments, the information handling system communicates with the AR device 130 via an input/output device 104. In various embodiments, the information handling system wirelessly communicates with the AR device 130 such as via a WiFi connection or a Bluetooth connection.

Figure 2:
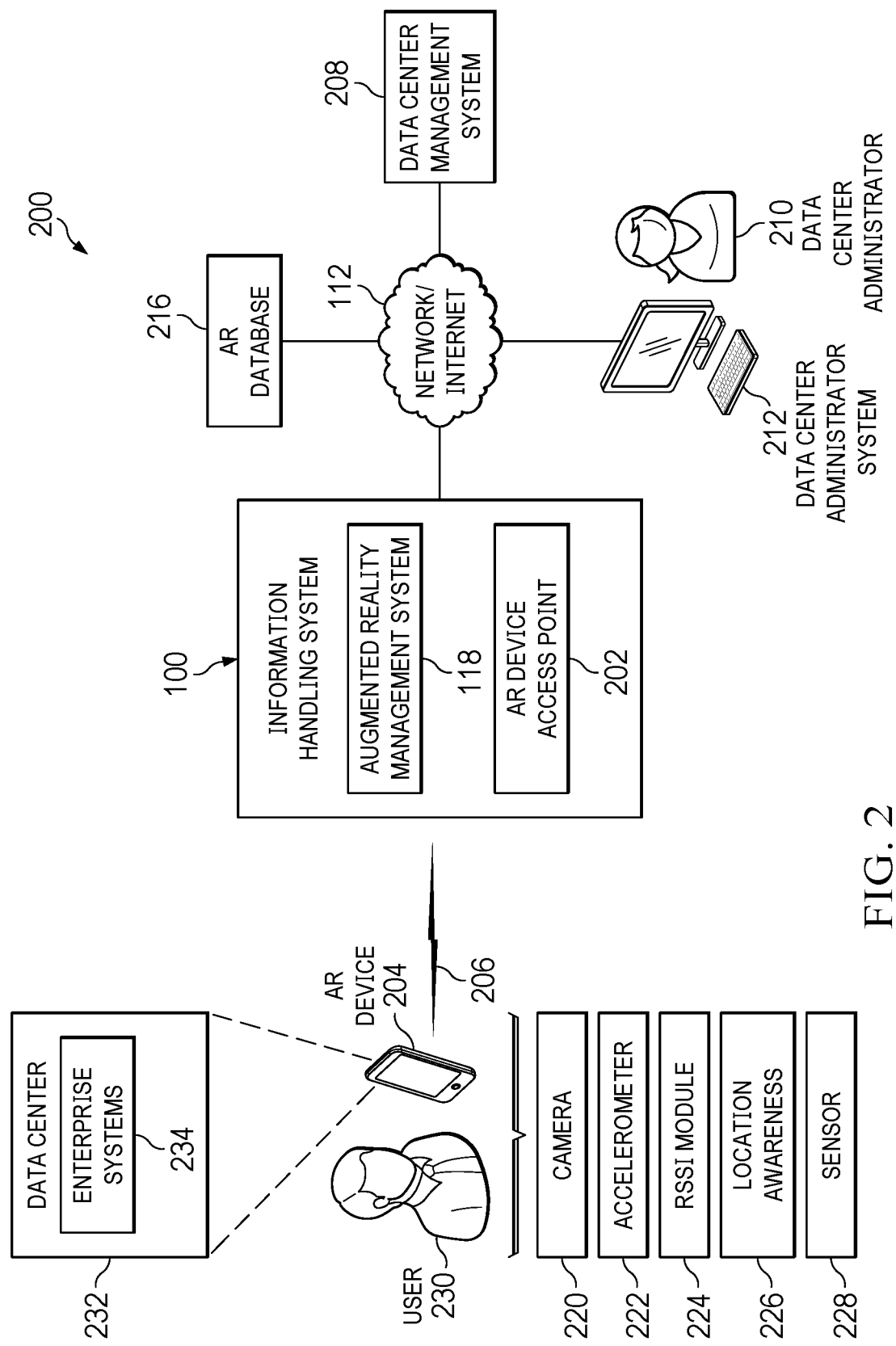
FIG. 2 shows a block diagram of a server rack having a plurality of information handling systems.

FIG. 2 shows an environment for augmented reality detection of enterprise systems in a data center. The environment 200 includes the information handling system 100 described in FIG. 1. In certain embodiments, the information handling system 100 includes augmented reality location identification system 118 and hard drive/disk 106 also referred to as database/storage 106. In certain implementations, the information handling system 100 includes an AR device access point 202. The AR device access point 202 provides for a connection access to an AR device 204. In certain embodiments, a wireless connection 206 (such as a Radio Frequency (RF) connection) is maintained between the AR device access point 202 and AR device 204.

In certain embodiments, the information handling system 100 connects with a data center management system 208 through the network 112. The data center management system 208 can be a cloud hosted machine or a user deployed enterprise solution. The data center management system 208 can have information and data as to hardware and configuration of data centers and is used to manage configuration and inventory of data centers. In certain embodiments, a data center administrator 210 through a data center administrator system 212 interacts with the data center management system 208. In certain embodiments, one or both the information handling system 100 and the data center management system 208 connect with an AR database 216 via the network 112. In certain embodiments, the AR device 204 may also communicate directly with the AR database 216.

In certain implementations, the AR device 204 includes one or more of a camera 220, an accelerometer 222, a received signal strength indication (RSSI) module 224, a location awareness component 226 and one or more other sensors 228. Camera 220 can be implemented with lenses having particularly focal lengths. In certain embodiments, determining a focal point of camera 220 is used in augmented reality to determine physical size of an image, such as an object in an enterprise system. In certain implementations, the accelerometer 222 is used to generate accelerometer data to calculate three-dimensional orientation of an enterprise system and objects, relative to the camera view. In certain implementations, the RSSI module 224 is used to determine signal strength between the AR device 204 and the AR device access point 202 of information handling system 100. In certain embodiments the signal strength can be used to calculate a relative distance. The relative distance can be correlated to measurements of objects in the enterprise system 234. In certain embodiments, the other sensors 228 can include one or more of a Bluetooth sensor such as a Bluetooth low energy (BLE) sensor, a global positioning system (GPS) sensor, a light detection and ranging (LIDAR) sensor and a compass. In various embodiments, the other sensors generate respective sensor information which can be used when performing AR tracking operations.

The camera 220 is configured to capture images of a data center 232, and particular enterprise systems 234 (i.e., data center assets) of the data center 232. In certain embodiments, AR device 204 can present images captured by the camera 220 along with augmented reality images, including videos of enterprise systems 232 and objects, such as hardware that make up enterprise systems 234. The augmented reality images are examples of AR projections. As used herein, an AR projection broadly refers to a rendering which is overlaid to align with a relevant object located within the point of view (POV) of the user. In various embodiments, the rendering may be one or more of a static rendering and a motion rendering. As used herein, point of view broadly refers to a user perspective of a portion of a physical environment. In various embodiments, images representing the point of view are presented within a display device of the AR device 204. Such augmented reality images may be provided to the information handling system 100 and the augmented reality location identification system 118. In certain implementations, a user 230 can identify particular enterprise systems 234 of data center 232 based upon the captured images as well as information stored within the database 216.

In certain embodiments, the AR location identification system 118 performs an AR location identification operation. In certain embodiments, the AR location identification operation uses a plurality of AR tracking methods to recognize common and unique AR targets. As used herein, an AR tracking method broadly refers to an electronic input used to provide location information, often in real time, for an AR device and its surroundings. In various embodiments, the AR tracking method can include one or more of visual information and other sensor information. In various embodiments, the visual information can include information generated from one or more of image recognition, object recognition, room recognition and bar code scanning operations. In various embodiments, the other sensor information can include information generated from one or more of a Bluetooth sensor such as a Bluetooth low energy (BLE) sensor, a global positioning system (GPS) sensor, a light detection and ranging (LIDAR) sensor, an accelerometer and a compass.

The location information can then be used such as for placement of AR projections. In certain embodiments, the AR location identification operation continuously uses the plurality of AR tracking methods. In certain embodiments, the AR location identification operation records relative two dimensional or three dimensional coordinates of common and unique AR targets in a database. In certain embodiments, the recorded coordinates provide a catalogue of points. These catalogued points can be recalled when a recorded target is within the field of view of an AR device. Such a catalog provides a robust database to project AR overlays accurately, even when the field of view is limited to a subset of items that would not otherwise be recognizable.

In certain embodiments, some or all unique identifiers may be placed via an augmented reality unique identifier placement operation. In various embodiments, the augmented reality unique identifier placement operation is an example of an augmented reality location operation. In general, the augmented reality unique identifier placement operation starts with an AR device 204 identifying a known target from the field of view of the AR device 204. Next, a new target is added to the environment relative to the known target. Next, the known target is scanned with the AR device and the position of the known target is identified. Next, the new target with the field of view of the AR device is scanned and the position of the new target is identified. Next, the position of the new target relative to the known target location is recorded. In various embodiments, a simultaneous localization and mapping (SLAM) operation is used when identifying the various locations within the environment. As used herein, a SLAM operation refers to a computational method of constructing or updating a map of a data center environment (whether the data center environment is known or unknown) while simultaneously tracking a location of an AR device within the data center environment. In various embodiments, the locations are identified within confident computations limits of SLAM.

Figure 3:
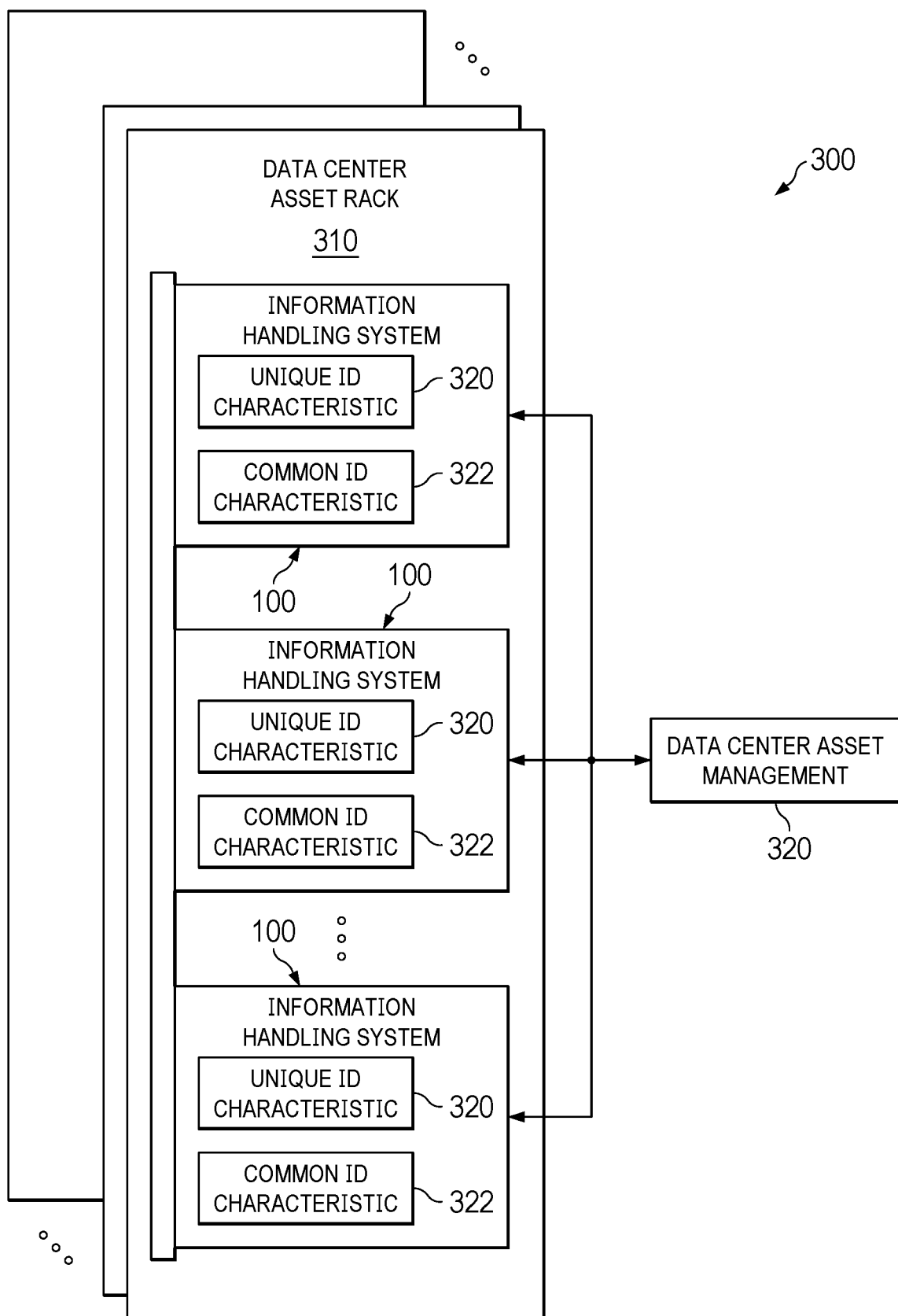
FIG. 3 shows a block diagram of a data center.

FIG. 3 shows a block diagram of a data center environment 300 having a plurality of server type information handling systems (e.g., data center assets). In certain embodiments, the server environment 300 includes one or more server racks 310. In certain embodiments, the server racks 310 maybe located within a data center. In certain embodiments, each server type information handling system corresponds to an information handling system 100.

As used herein, a data center broadly refers to a building, a dedicated space within a building, or a group of buildings, used to house a collection of interrelated data center assets implemented to work in combination with one another for a particular purpose. As likewise used herein, a data center asset broadly refers to anything tangible, or intangible, that can be owned, controlled, or enabled to produce value as a result of its use within a data center. In certain embodiments, a data center asset may include a product, or a service, or a combination of the two. In certain embodiments, a data center asset includes an information handling system. In certain embodiments, a data center asset can include one or both of a unique identification characteristic 320 and a common identification characteristic 322. In certain embodiments, a plurality of common identification characteristics 322 can provide a unique identification characteristic. In various embodiments, a plurality of common identification characteristics 322 may form an augmented reality constellation which provides a unique identification characteristic. As used herein, an augmented reality constellation broadly refers to a plurality of physically proximate data center assets which in combination may be associated with a particular location within a data center. In certain embodiments, the one or both the unique identification characteristics 320 and the common identification characteristics 322 can be used as AR targets. In certain embodiments, one or more unique identification characteristics 320 can be used as a unique identification target. In certain embodiments, a plurality of common identification characteristics 322 can be used as a unique identification target.

Figure 4:
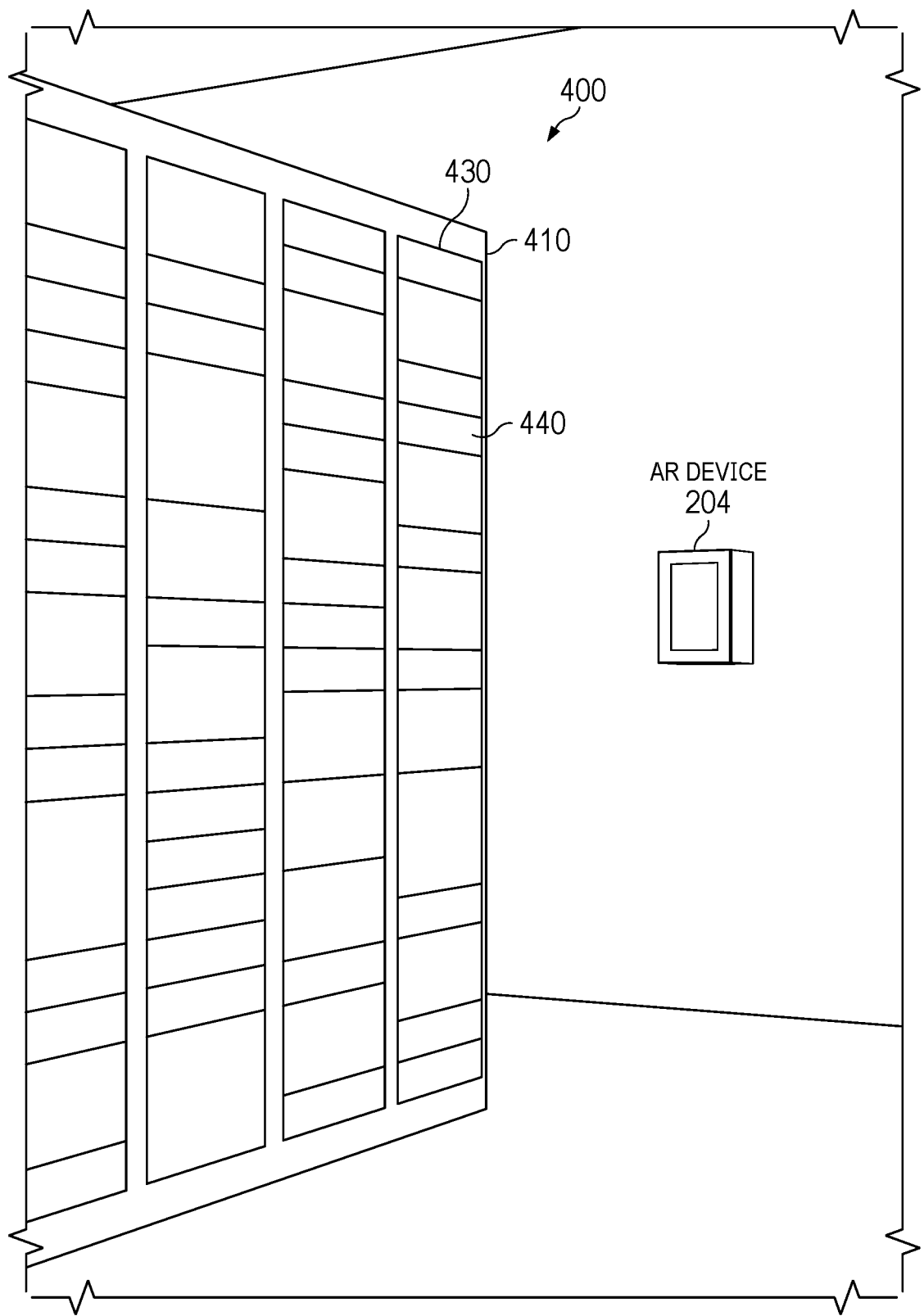
FIG. 4 shows a perspective view of a portion of a data center.

FIG. 4 shows a perspective view of an augmented reality IT environment 400. The IT environment 400 includes a data center rack 410 which includes a plurality of information handling systems 100. In various embodiments, the physical portion of the IT environment 400 can include the front, the rear or the interior of a particular information handling system 440 mounted within the data center rack 410 of the IT environment 400.

In various embodiments, the data center rack 410 can include one or more columns 430. In various embodiments, each of the one or more columns 430 can include one or more data center assets. In various embodiments, respective data center assets can include one or more unique identification characteristics (e.g., unique identification characteristic 320) and common identification characteristics (e.g., common identification characteristics 322). In various embodiments, the unique and common identification characteristics can function as augmented reality targets.

In various embodiments, data center assets within the data center each have respective dimensions. In various embodiments, the dimensions include height, width and depth. In various embodiments, some of these dimensions are detectable by an AR device. In various embodiments, some or all of the data center assets include a bezel. In various, each bezel includes certain bezel characteristics (e.g., bezel height, width, color, shape). In certain embodiments the height of the data center asset and a data center bezel correspond to particular rack units. In certain embodiments, the height of the data center asset and the date center bezel correspond to heights of 2RU, 4RU, 6RU and 8RU. IN various embodiments, a column 430 can include various combinations of data center assets some of which have varying different heights. Additionally other columns 430 can include other combinations of data center assets some of which have varying different heights.

As used herein, a unique identification characteristic broadly refers to a characteristic which is associated with a particular data center asset. In various embodiments, the unique identification characteristic may be detected by the AR device. In various embodiments, the characteristics may be visually detected by the camera of the AR device. In various embodiments, the unique characteristics may be detected using a combination of one or more of the camera, the accelerometer, the RSSI module and the location awareness of the AR device. Examples of a unique identification characteristic include a QR code, an AR bar, an AR tape, an AR sticker, a physically encoded bezel and an AR constellation.

As used herein, a common identification characteristic broadly refers to a characteristic which can be associated with one or more data center assets. In various embodiments, the common identification characteristic may be detected by the AR device. In various embodiments, the common identification characteristics may be visually detected by the camera of the AR device. In various embodiments, the common identification characteristics may be detected using a combination of one or more of the camera, the accelerometer, the RSSI module and the location awareness of the AR device. Examples of a common identification characteristic include a part number identifier, data center asset dimensions (e.g., height, width, depth) and bezel characteristics (e.g., bezel height, width, color, shape).

Figure 5:
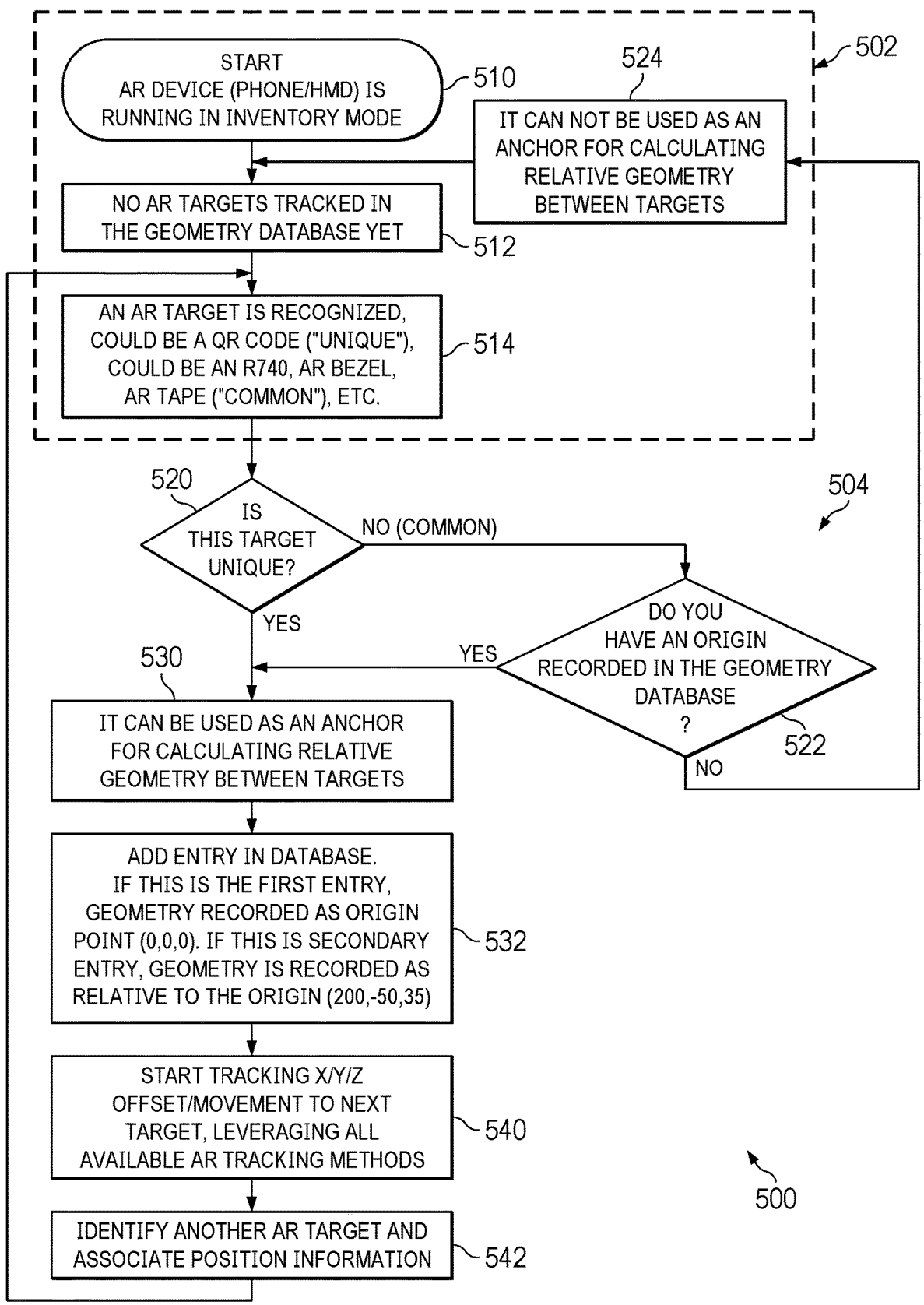
FIG. 5 shows a flow chart of a unique identifier placement operation.

FIG. 5 shows a flow chart of an augmented reality target location generation operation 500. An augmented reality target location generation operation is one example of an augmented reality location operation. In various embodiments, the augmented reality target location generation operation 500 includes one or both of a handoff portion 502 and a location identification portion 504. The handoff portion 502 begins at step 510 with an AR device 204 executing in an inventory mode of operation. As used herein, an inventory mode of operation refers to a mode of operation during which the augmented reality device observes its surroundings with a goal of obtaining one or more data center identification characteristics. Next, at step 512 the AR device 204 accesses a geometry database such as an AR database and determines that there are no AR targets tracked by the database. Next, at step 514 when observing its surroundings, the AR device 204 identifies an AR target. When an AR target is identified, the augmented reality target location generation operation 500 transitions to the location identification portion 504.

Next, at step 520, the augmented reality target location generation operation 500 determines whether the AR target is unique. In various embodiments, the AR target may be considered unique when an identification characteristic of the AR target includes a unique identification characteristic. If the AR target is not unique, then the augmented reality target location generation operation 500 proceeds to step 522 to determine whether the identified AR target has an associated location entry stored within the AR database. If the AR target does not have an associated location entry, then the augmented reality target location generation 500 operation proceeds to step 524 during which the AR device 204 determines that the identified AR target cannon be used as an anchor for calculating relative geometry between targets.

When the AR target is determined to be unique at step 520 or when the AR target has an associated entry stored in the database as determined at step 522, the augmented reality location identification operation 500 proceeds to step 530 during which the AR device 204 determines that the identified target can be used for calculating relative geometry of targets. Next at step 532 a location entry is added to the database. In various embodiments, the location entry includes X, Y and Z coordinate information When the location entry for this AR target is the first entry, the location entry is recorded as a point of origin. In various embodiments, the point of origin may be recorded with a location of 0,0,0. When the location entry for this AR target is other than the first entry (i.e., a secondary entry), the location entry is recorded with information relative to a point of origin. In various embodiments, the information relative to the point of origin may have a positive, zero or negative value. In various embodiments, the information relative to the point of origin may be X, Y and Z coordinates relative to the point of origin (e.g., 200, −50, 35).

Next at step 540, the AR device 204 tracks its position as the AR device 204 attempts to observe its next AR target. In various embodiments, the position of the AR device 204 may be tracked based upon one or both of its offset and movement. In various embodiments, a plurality of AR tracking methods are used when tracking the position of the AR device 204. Next, at step 542 another AR target is identified and the position information is associated with this AR target. Next, the augmented reality target location generation operation 500 returns to step 520 when another AR target is identified.

Figure 6:
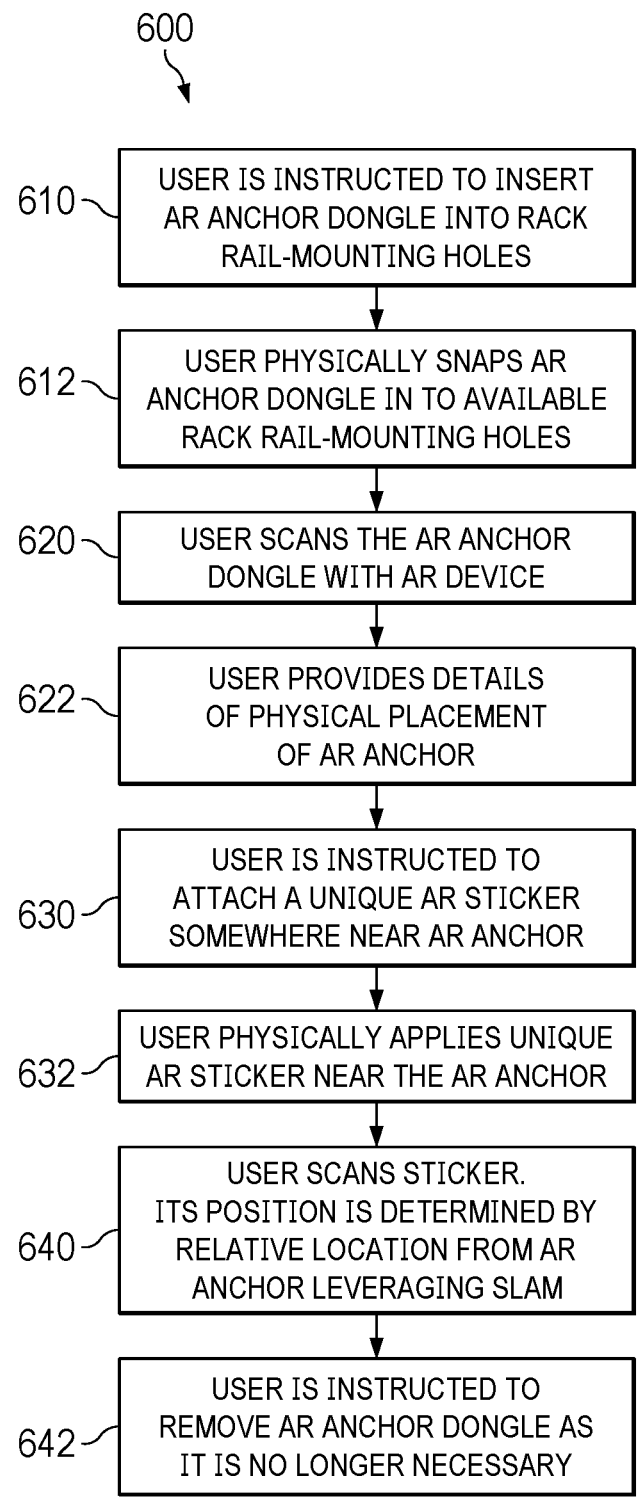
FIG. 6 shows a flow chart of an augmented reality unique identifier placement operation.

FIG. 6 shows a flow chart of augmented reality unique identifier placement operation 600. An augmented reality unique identifier placement operation is an example of an augmented reality location operation. In various embodiments, the unique identifier placement operation 600 makes use of one or more of an AR anchor dongle and a unique target such as an AR sticker to reduce AR drift. As used herein, an AR anchor dongle broadly refers to a device which includes visual indicia designed to be easily accessed and interpreted by an AR device. In various embodiments, an AR anchor dongle also includes physical characteristics (e.g., notches and projections) which facilitate physically coupling the AR dongle with a particular location in a data center. In various embodiments, the physical characteristics allow the AR anchor dongle to be attached to a particular location of a server rack within a data center. As used herein, an AR sticker broadly refers to a substantially two dimensional component which may be physically attached to a particular location within a data center. In various embodiments, the AR sticker includes a unique identifier. In various embodiments, the unique identifier includes a quick response (QR) code representation. In various embodiments, the AR sticker includes a means for attaching the AR sticker to a particular location within a data center. In various embodiments the means for attaching can include one or more of an adhesive portion and a magnetic portion. In various embodiments, the AR sticker functions as an augmented reality marker once the position (whether relative or actual) is recorded within an AR database. As used herein, an AR marker broadly refers to a two dimensional graphic which can be used by an AR device for digitally tracking an object relative to the position of the AR marker in three dimensional space.

In various embodiments, the unique identifier placement operation 600 begins at step 610 with a user being instructed to physically couple an AR anchor dongle to a particular location of a data center. In various embodiments, the instruction can include instructing the user to insert the AR anchor dongle to a particular location in a server rack. In various embodiments, the particular location is represented as a rack unit (RU) location within a particular server rack. In various embodiments, a particular RU location includes a three-hole set of apertures within a side of a server rack. In various embodiments, the AR dongle is physically coupled by insert the AR dongle to particular rack rail mounting apertures. In certain embodiments, the instructions can include an AR projection providing a visual indication of how to physically couple the AR anchor dongle with the rack. Next, at step 612 the user physically attaches the AR anchor dongle to the particular location on the server rack.

Next at step 620, the user scans the AR anchor dongle with an AR device. Next at step 622, the user provides AR anchor location information regarding the physical placement of the AR anchor dongle. In various embodiments, the AR anchor location information can include one or more of to which particular rack within a data center the AR anchor dongle is attached, the particular rack unit to which the AR anchor dongle is attached and whether the AR anchor dongle is attached to the right or left of the particular rack. In various embodiments, this AR anchor dongle location information can be stored within an AR database.

Next at step 630, the user is instructed to attach a unique identifier in proximity to the location in the data center to which the AR anchor dongle is attached. In various embodiments, the unique identifier includes an AR sticker. Next at step 632 the user physically attaches the unique identifier proximate to the location in the data center to which the AR anchor dongle is attached.

Next at step 640, the user scans the unique identifier via the AR device. The position of the unique identifier is then determined relative to the location of the AR anchor dongle. Because the location of the AR anchor dongle within the data center is known, the position of the unique identifier is also known. Thus, the unique identifier can also be used by the AR device as a unique target. The unique identifier location information is stored within the AR database. In certain embodiments, the relative location of the unique identifier may be obtained via a SLAM operation. Next at step 642, the user is instructed to remove the AR anchor dongle as the AR anchor dongle is no longer necessary to provide a unique AR target for the AR device.

By providing one or more unique identifiers with known locations within the data center environment, AR drift may be minimized whenever such a unique target is within the field of view (FOV) of the AR device. By having a known location associated with the unique identifier, tracking methods may more accurately identify a location of a point of view as compared to methods which do not make use of known identifiers. As used herein, a field of view of an AR device broadly refers to the location of an AR device identified via sensory inputs that fall within an immediate purview of the AR device (i.e., sensory inputs that are immediately accessed by the AR device. An immediate purview of the AR device may also take into account the peripheral purview of the AR device (i.e., sensory inputs that are close but not immediately accessed by the AR device). It will be appreciated that the field of view of the AR device may be larger (i.e., may encompass more space) than a point overview of the AR device.

In various embodiments, the unique identifier placement operation 600 makes use of one or more of an AR anchor dongle and a unique target such as an AR sticker or an AR tape to reduce AR drift. As used herein, an AR anchor dongle broadly refers to a device which includes visual indicia designed to be easily accessed and interpreted by an AR device. In various embodiments, an AR anchor dongle also includes physical characteristics (e.g., notches and projections) which facilitate physically coupling the AR dongle with a particular location in a data center. In various embodiments, the physical characteristics allow the AR anchor dongle to be attached to a particular location of a server rack within a data center. As user herein, an AR sticker broadly refers to a substantially two dimensional component which may be physically attached to a particular location within a data center. In various embodiments, the AR sticker includes a unique identifier. In various embodiments, the unique identifier includes a quick response (QR) code representation. In various embodiments, the AR sticker includes a means for attaching the AR sticker to a particular location within a data center. In various embodiments the means for attaching can include one or more of an adhesive portion and a magnetic portion.

It will be appreciated that an AR tape may or may not make use of an QR dongle to be attached to a particular location when performing an augmented reality location operation. For example, the AR tape by itself can include enough unique information to identify a particular location within a data center. Once the particular location is identified, other unique or common AR targets can be location using relative positions.

By providing one or more unique identifiers with known locations within the data center environment, AR drift may be minimized whenever such a unique target is within the field of view (FOV) of the AR device. By having a known location associated with the unique identifier, tracking methods may more accurately identify a location of a point of view as compared to methods which do not make use of known identifiers. As used herein, a field of view of an AR device broadly refers to the location of an AR device identified via sensory inputs that fall within an immediate purview of the AR device (i.e., sensory inputs that are immediately accessed by the AR device. An immediate purview of the AR device may also take into account the peripheral purview of the AR device (i.e., sensory inputs that are close but not immediately accessed by the AR device). It will be appreciated that the field of view of the AR device may be larger (i.e., may encompass more space) than a point overview of the AR device.

Figure 7:
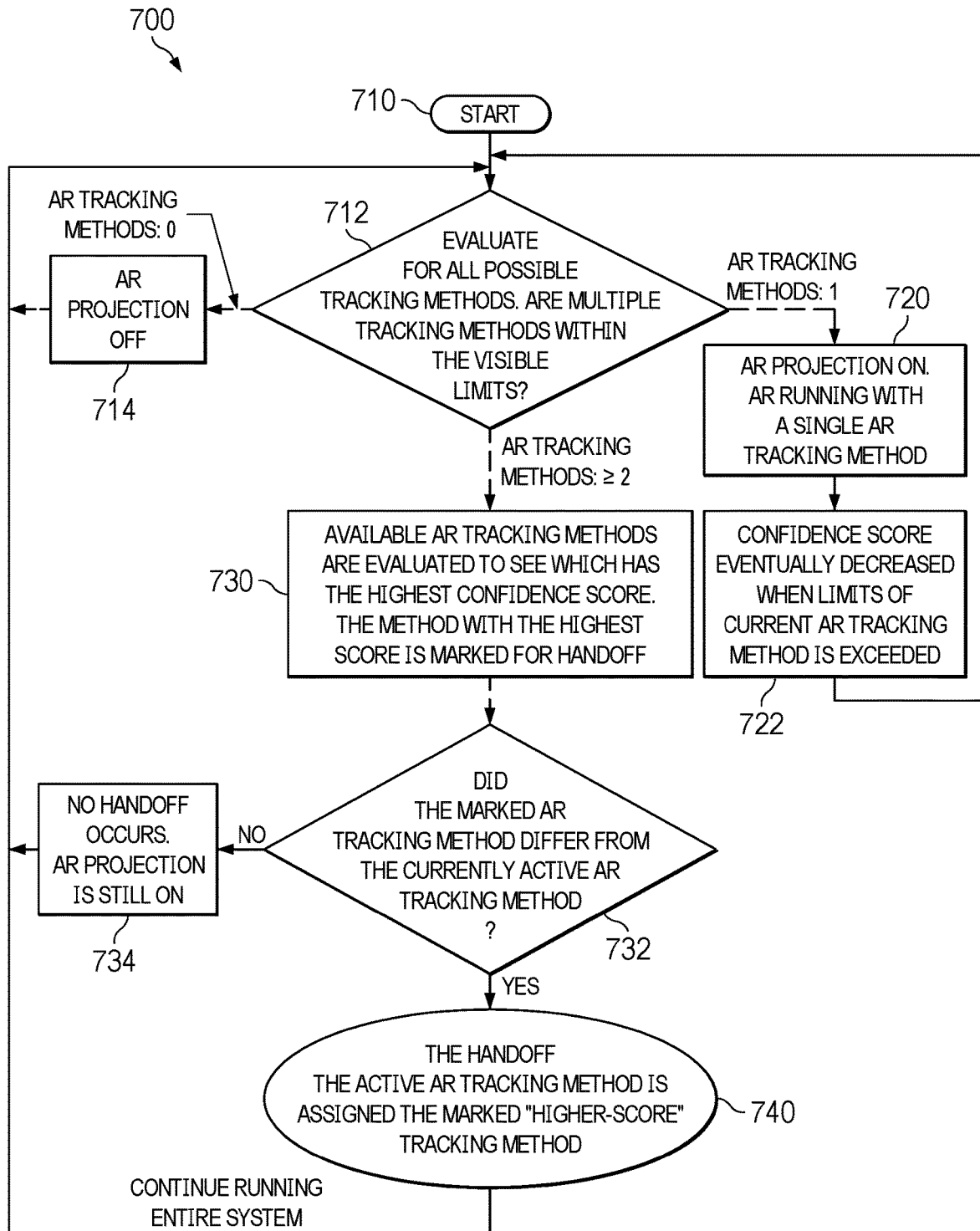
FIG. 7 shows a flow chart of an augmented reality tracking handoff operation.

FIG. 7 shows a flow chart of an augmented reality tracking handoff operation 700. The augmented reality tracking handoff operation 700 starts at step 710 with no AR tracking method selected. Next at step 712, possible tracking methods are identified. When identifier possible tracking methods a plurality of tracking methods are reviewed to determine whether one or more of the plurality of tracking methods are with the visible limits of the AR device. If there are no tracking methods within the visible limits of the AR device, which corresponds to zero tracking methods, then the augmented reality projection function of the AR device is turned off at step 714. If the field of view of the AR device changes, then control returns to step 712 to identify possible tracking methods.

If there is single tracking within the visible limits of the AR device then AR projection is turned on at step 720. With this step, AR projection on the AR device executes with the single tracking method. An AR tracking method confidence score associated with the tracking method is repeatedly evaluated during step 722. Additionally, the field of view of the AR devices is repeatedly reviewed during step. Eventually, likely due to AR drift, the AR tracking method confidence score decreases to be below a confidence level threshold. When the AR tracking method confidence score decreases to be below the confidence level threshold, control returns to step 712 to identify possible tracking methods. Alternately or additionally, if the field of view of the AR device changes, then control returns to step 712 to identify possible tracking methods.

If more than a single tracking is within the visible limits of the AR device, then control transfers to step 730. During step 730, the identified AR tracking methods are evaluated to determine which of the identified tracking method provides a higher resolution of the AR target. As used herein, higher resolution broadly refers to how closely an identified location of an AR target aligns with an actual location of the AR target. In certain embodiments, the determination of whether another tracking method provides a higher resolution of the AR target includes generating an AR tracking confidence score for each of the plurality of AR tracking methods and the determining identifies an AR tracking method having a higher AR tracking method confidence score. The AR tracking method with the highest AR tracking method confidence score is identified for handoff. Next, at step 732, the operation determines whether the tracking method identified for handoff differs from the currently active AR tracking method. If the tracking method with the highest AR tracking method confidence score is the presently selected tracking method, then no handoff occurs and AR projection continues at step 734 and control returns to step 712 to continue to identify possible tracking methods.

Next at step 740 a handoff occurs where the active AR tracking method is assigned to the tracking method which was selected at step 732. During the handoff, positional metrics from the previous AR tracking method are captured and provided to the new active AR tracking method. In various embodiments, the positional metrics include contextual data which would otherwise not be exposed to the new active tracking method. In certain embodiments, the tracking handoff provides the same tracked data set relative to different size scales and different points of view.

In various embodiments, the AR tracking method confidence score is generated based upon at least one augmented reality factor. In various embodiments, the one or more factors include at least one physical factor (also referred to as an object detection factor), at least one lighting condition factor, at least one predictive analysis factor, and at least one field of view prioritization factor. In various embodiments, the physical factor provides information regarding a recognized physical object (e.g., a server or portion of a server). The information may include or be associated with an image of the recognized physical object. In various embodiments, the lighting condition factor provides an indication of whether light or dark conditions are present in the present field of view. When dark conditions are present, the AR tracking method confidence score deprioritizes visual tracking methods and promotes other sensor methods such as gyroscope, LIDAR, etc. In various embodiments, the predictive analysis factor takes into account vector information and velocity information associated with the AR device. In various embodiments, the field of view prioritization factor provides an indication of a field of view level from a plurality of field of view levels. In various embodiments, based upon the field of view level, certain tracking methods may be deprioritized whereas other tracking methods may be promoted. For example, if the AR device is positioned relatively far from a server rack, server level tracking methods may be deprioritized whereas rack and room level tracking methods may be promoted. In various embodiments, the field of view level may include one or more of a port field of view level, a server field of view level, a multi-unit (i.e., a constellation) field of view level, a rack field of view level, a multi rack field of view level, an aisle field of view level and a room field of view level.

For example, when using an image tracking method, an AR device has information regarding which images can be identified by the AR device. When the AR device recognizes all or part of a captured image, the AR device triggers a comparison of the known target data and the observed target data, which in this case includes pixel data. This comparison is used to determine a percentage the observed target matches the known target. In various embodiments, this percentage is used to generate an AR tracking method confidence score for the image tracking method. In various embodiments, the AR tracking method confidence score uses a scale from 0-100. A similar method can be used when the AR device obtains other known target data such as objects, areas, ground planes, etc.

For example, an AR tracking method confidence score may be set to 100 for an AR tracking method when the AR target is within the immediate purview of the AR device (e.g., is close to the target). An AR tracking method confidence score of 100 indicates a high likelihood that no AR drift is present for the associated AR tracking method. An AR tracking method confidence score may be set to 75 when the AR target is within immediate purview of AR device, but the target is either at a distance or partially obstructed from the AR device. An AR tracking method confidence score of 75 indicates the AR target is recognized but AR drift may occur for the associated AR tracking method. An AR tracking method confidence score may be set to 50 when the AR target is being tracked with a peripheral purview (e.g., by using a SLAM operation) of the AR device. An AR tracking method confidence score of 50 indicates the AR target just exited immediate purview of the AR device.

An AR tracking method confidence score may be set to 25 when the AR target is being tracked with peripheral purview (e.g., by using a SLAM operation) of the AR device. An AR tracking method confidence score of 25 indicates the AR target has larger exit from immediate purview of the AR device. Such a score may also prompt an indication to attempt to obtain another AR target. An AR tracking method confidence score may be set to 0 when the AR target is not recognized by the associated AR tracking method of the AR device. An AR tracking method confidence score of 0 indicates that the AR tracking method is not able to recognize the AR target. Accordingly, this method should not be used to track the target. If all AR tracking methods have an AR confidence score of 0 then no tracking of the target is performed.

Figure 8:
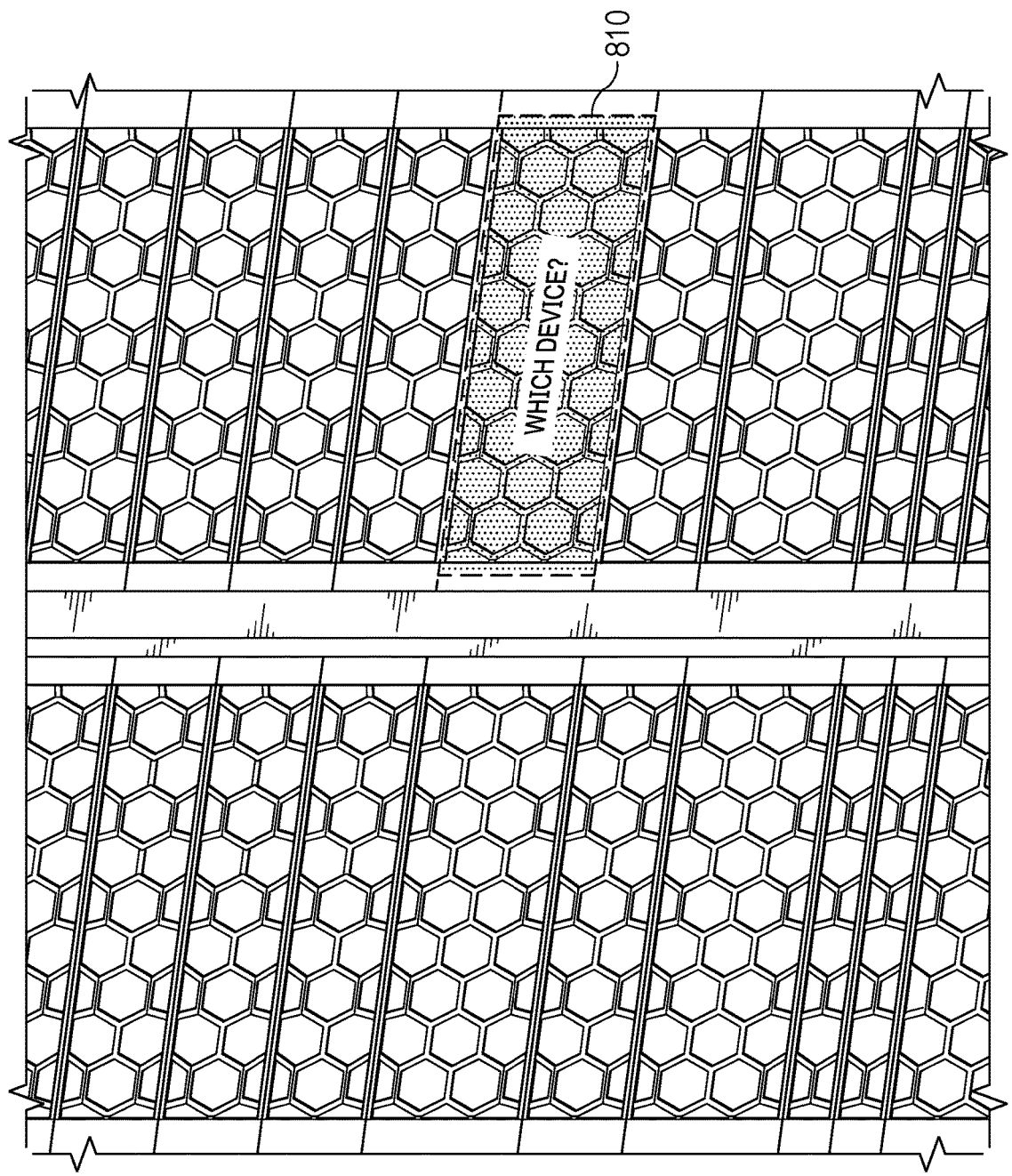
FIG. 8 shows a perspective view of a portion of a data center asset rack.
Figure 9:
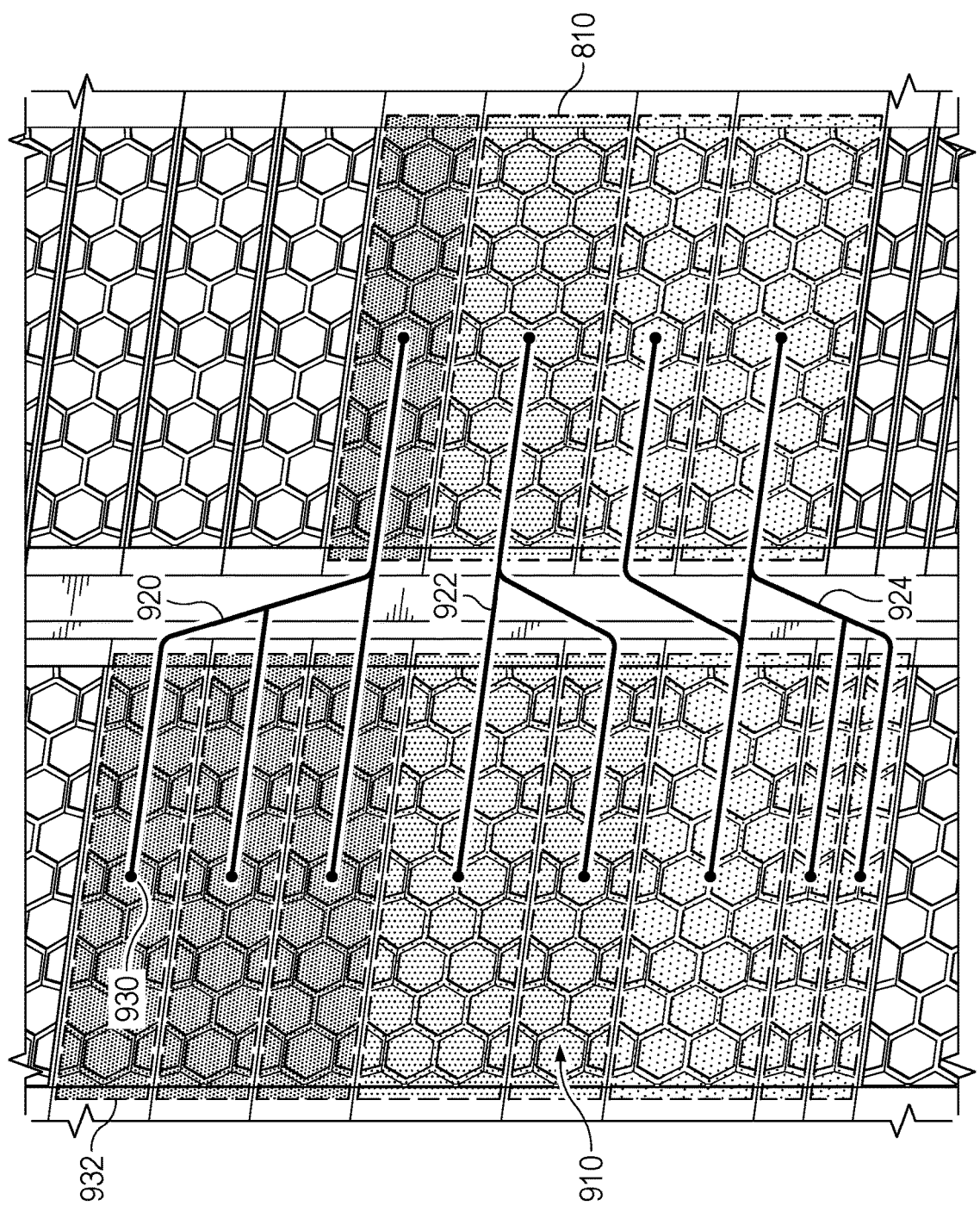
FIG. 9 shows a perspective view of a portion of a data center asset rack.

FIG. 8 shows a perspective view of a portion of a data center asset rack. FIG. 9 shows a perspective view of a portion of a data center asset rack. More specifically, FIG. 8 shows a perspective view of a portion of a data center asset rack with an example AR projection. With this example, the AR projection is questioning which device is in the field of view of the AR device. Also, with this example there are no unique AR targets from which the AR device can identify a location within a data center and thus which device is in the field of view of the AR device.

In this situation, an augmented reality constellation 910 may be used to identify the location within the data center. When a location within a data center is located, the particular data center asset can also be identified. In various embodiments, an augmented reality constellation may be used to provide a frame of reference for determining a location within a data center without a need for other unique identifiers such as a QR code, AR sticker, etc.

In various embodiments, an augmented reality constellation 910 may include a plurality of sub constellations 820, 922 and 924. Each constellation (or sub constellation) includes a plurality of identification characteristics 930. In various embodiments, each sub constellation may be its own augmented reality constellation if it includes enough identification characteristics to be unique identified. In various embodiments, the identification characteristics can include a plurality of common identification characteristics, one or more unique identification characteristics or a combination thereof. Each augmented reality constellation or sub combination thus provides a unique AR target.

In various embodiments, AR constellation locations for respective AR constellations are stored within the AR database. In various embodiments, other location operations, such as location operation using an AR dongle location, may be used to initially identify an AR constellation location.

In various embodiments, one or more AR constellations may be used with a unique identifier placement, augmented reality unique identifier placement and augmented reality tracking handoff when performing an augmented reality operation such as an augmented reality projection operation or a combination thereof.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A method for performing an augmented reality location operation comprising:
    configuring an augmented reality device to perform an augmented reality tracking method;
    identifying a unique augmented reality target using the augmented reality tracking method, the unique augmented reality target comprising an augmented reality constellation, the augmented reality constellation comprising a unique identification characteristic and a common identification characteristic, the unique identification characteristic and the common identification characteristic being positioned on respective physically proximate data center assets, a combination of the unique identification characteristic and the common identification characteristic providing the augmented reality constellation;
    associating a position with the unique augmented reality target; and,
    using the position to perform an augmented reality projection operation.

2. The method of claim 1, wherein:
    the augmented reality constellation comprises a plurality of common identification characteristics.

3. The method of claim 2, wherein:
    each of the plurality of common identification characteristics is associated with a respective data center asset.

4. The method of claim 3, wherein:
    at least some of the plurality of common identification characteristics comprise certain dimensions of a respective data center asset.

5. The method of claim 3, wherein:
    at least some of the plurality of common identification characteristics comprise a respective characteristic associated with a bezel of a respective data center asset.

6. The method of claim 1, wherein:
    the augmented reality constellation comprises a plurality of augmented reality sub constellations.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
    configuring an augmented reality device to perform an augmented reality tracking method;
    identifying a unique augmented reality target using the augmented reality tracking method, the unique augmented reality target comprising an augmented reality constellation, the augmented reality constellation comprising a unique identification characteristic and a common identification characteristic, the unique identification characteristic and the common identification characteristic being positioned on respective physically proximate data center assets, a combination of the unique identification characteristic and the common identification characteristic providing the augmented reality constellation;
    associating a position with the unique augmented reality target; and,
    using the position to perform an augmented reality projection operation.

8. The system of claim 7, wherein:
    the augmented reality constellation comprises a plurality of common identification characteristics.

9. The system of claim 8, wherein:
    each of the plurality of common identification characteristics is associated with a respective data center asset.

10. The system of claim 9, wherein:
    at least some of the plurality of common identification characteristics comprise certain dimensions of a respective data center asset.

11. The system of claim 9, wherein:
    at least some of the plurality of common identification characteristics comprise a respective characteristic associated with a bezel of a respective data center asset.

12. The system of claim 7, wherein:
    the augmented reality constellation comprises a plurality of augmented reality sub constellations.

13. A non-transitory, computer-readable storage medium embodying computer program code, the computer program code comprising computer executable instructions configured for:
    configuring an augmented reality device to perform an augmented reality tracking method;
    identifying a unique augmented reality target using the augmented reality tracking method, the unique augmented reality target comprising an augmented reality constellation, the augmented reality constellation comprising a unique identification characteristic and a common identification characteristic, the unique identification characteristic and the common identification characteristic being positioned on respective physically proximate data center assets, a combination of the unique identification characteristic and the common identification characteristic providing the augmented reality constellation;
    associating a position with the unique augmented reality target; and,
    using the position to perform an augmented reality projection operation.

14. The non-transitory, computer-readable storage medium of claim 13, wherein:
    the augmented reality constellation comprises a plurality of common identification characteristics.

15. The non-transitory, computer-readable storage medium of claim 14, wherein:
   each of the plurality of common identification characteristics is associated with a respective data center asset.

16. The non-transitory, computer-readable storage medium of claim 15, wherein:
   at least some of the plurality of common identification characteristics comprise certain dimensions of a respective data center asset.

17. The non-transitory, computer-readable storage medium of claim 15, wherein:
   at least some of the plurality of common identification characteristics comprise a respective characteristic associated with a bezel of a respective data center asset.

18. The non-transitory, computer-readable storage medium of claim 13, wherein:
   the augmented reality constellation comprises a plurality of augmented reality sub constellations.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *